Sept. 3, 1957  M. J. WILSON  2,804,635
VEHICLE WASHING MACHINE
Filed Oct. 19, 1955  4 Sheets-Sheet 1

INVENTOR:
MARVIN J. WILSON
BY
ATT'YS

Sept. 3, 1957  M. J. WILSON  2,804,635
VEHICLE WASHING MACHINE
Filed Oct. 19, 1955  4 Sheets-Sheet 2
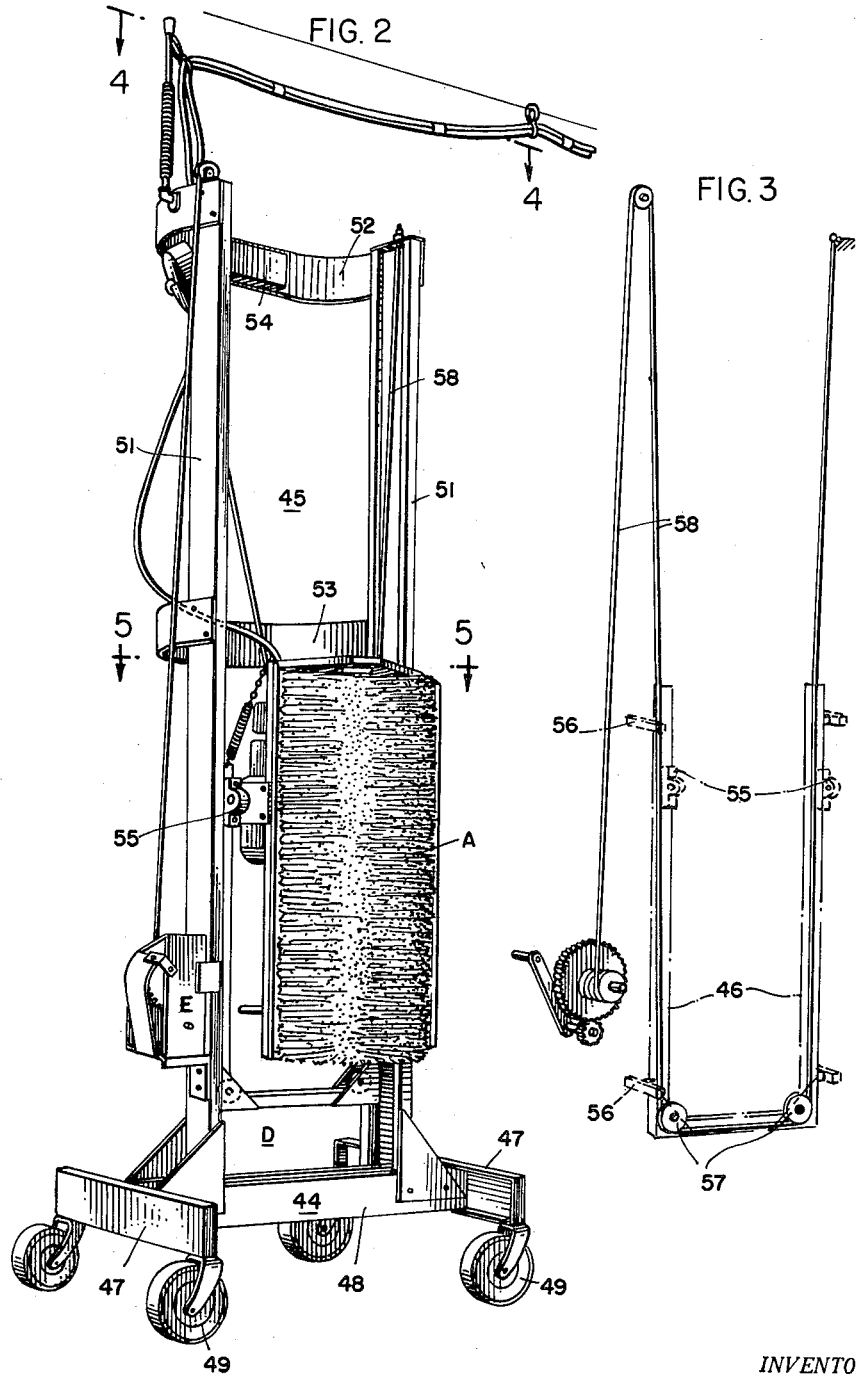
INVENTOR:
MARVIN J. WILSON
BY 
ATT'YS Sept. 3, 1957 M. J. WILSON 2,804,635
VEHICLE WASHING MACHINE
Filed Oct. 19, 1955 4 Sheets-Sheet 3
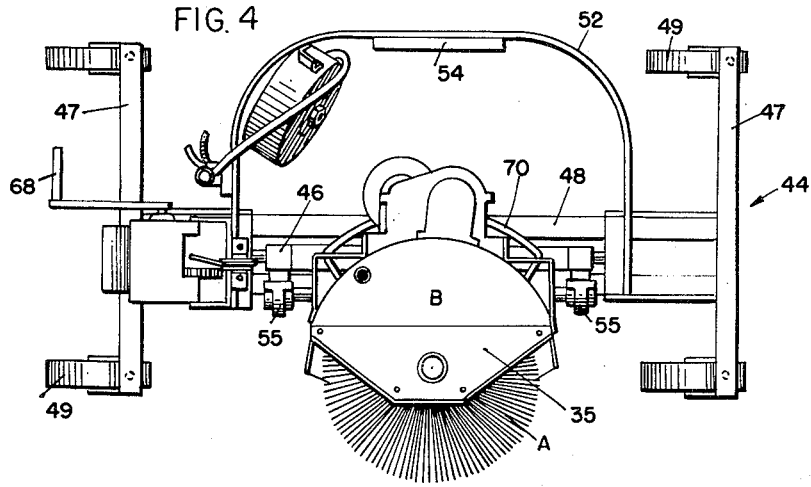
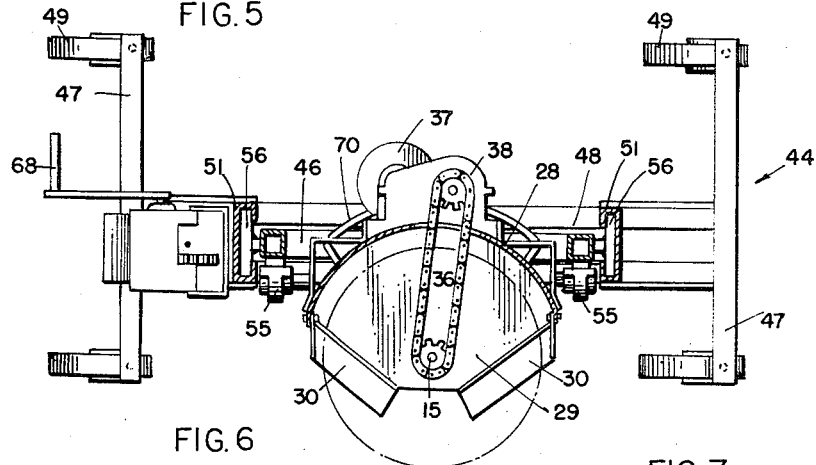
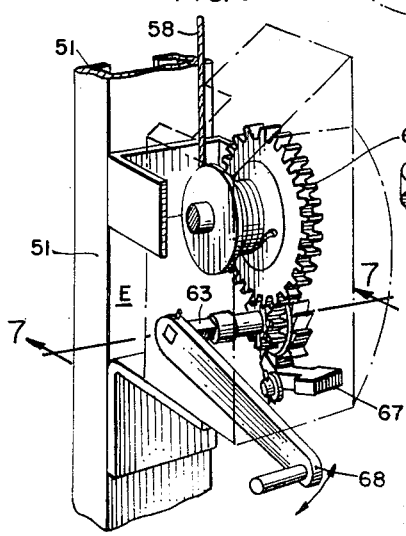
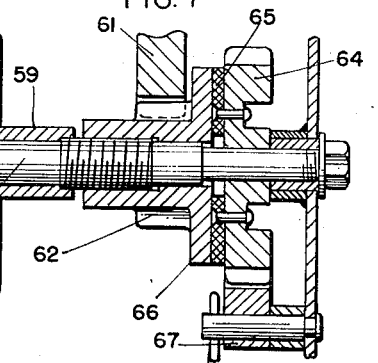
INVENTOR:
MARVIN J. WILSON
BY
ATT'YS Sept. 3, 1957 M. J. WILSON 2,804,635
VEHICLE WASHING MACHINE
Filed Oct. 19, 1955 4 Sheets-Sheet 4
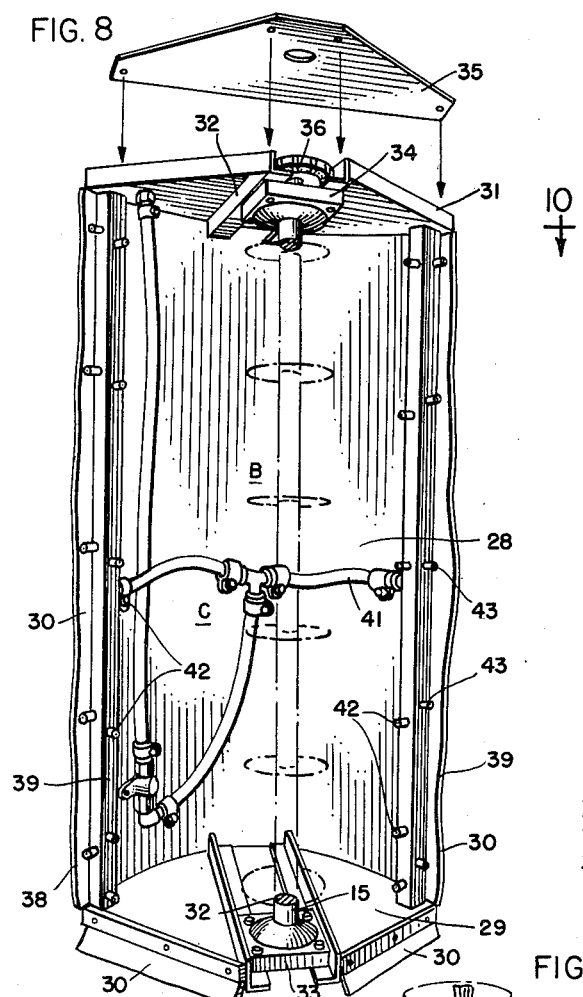
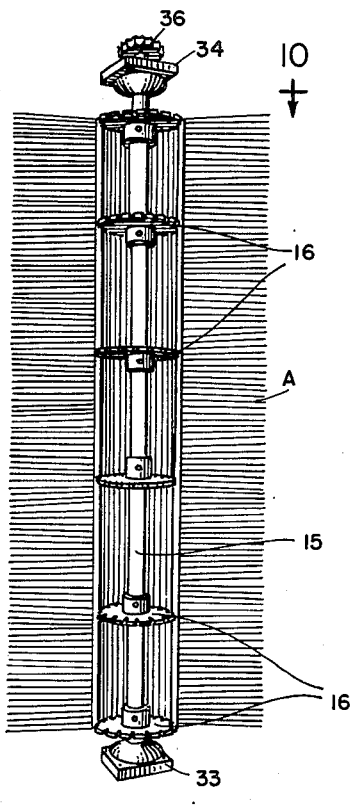
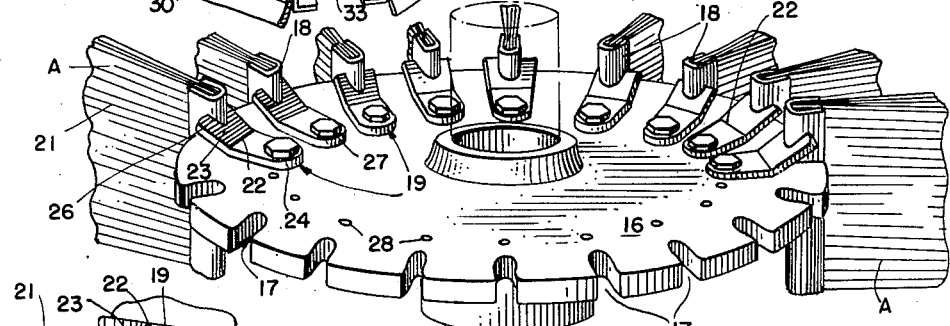
*INVENTOR:*
MARVIN J. WILSON
BY 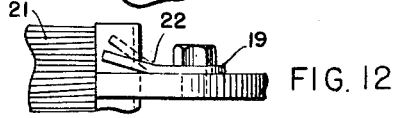
ATT'YS

United States Patent Office 2,804,635
Patented Sept. 3, 1957

2,804,635

VEHICLE WASHING MACHINE

Marvin J. Wilson, Chicago, Ill.

Application October 19, 1955, Serial No. 541,329

3 Claims. (Cl. 15—21)

This invention relates to motor-vehicle washing machines.

The extensive development of motor-truck transport vehicles has presented the users thereof with the problem of exterior washing. The more extensive these transport truck bodies have become, the more acute has been the problem of economically effecting washing operations. Various forms of ceiling-suspended and over-the-floor truck-suspended apparatus have been developed and experimented with. However, none of these devices has permitted a facility and frequency of use commensurate with ecomomical requisites.

The main objects of this invention are to provide an improved form of motor-vehicle washing machine; to provide an improved motor-vehicle washing machine for manual movement on the floor around the vehicle to be washed; to provide an improved construction of the brush for machines of this kind; to provide improved means for effecting a vertical adjustment and angular tilting of the brush to accommodate vehicle bodies of varying heights and shapes; and to provide such a motor-vehicle washing machine so simple in its construction as to permit economical fabrication almost entirely from parts and operating mechanisms obtainable on the open market.

In the embodiment shown in the accompanying drawing,

Fig. 2 is a similar perspective of the washing machine, from the brush side showing the brush in its lowered position.

Fig. 3 is a schematic view showing the cable suspension whereby the rotating brush is vertically adjusted with respect to the vehcile.

Fig. 4 is a top plan of this improved washing machine as viewed from the plane of the line 4—4 of Fig. 2.

Fig. 5 is a transverse sectional view taken on the plane of the line 5—5 of Fig. 2.

Fig. 6 is a perspective view of a conventional type of winch used for vertically adjusting the brush with respect to the vehicle body being washed.

Fig. 7 is a fragmentary, sectional, detail taken on the plane of the line 7—7 of Fig. 6.

Fig. 8 is a partially exploded, inside view of the mounting shield for the brush.

Fig. 9 is a vertical sectional view of the brush structure.

Fig. 10 is an enlarged perspective view of the upper end of the brush structure, showing how the bristles are removably retained in place; and Figs. 11 and 12 are fragmentary, plan and side views of one of the clamped-in-place bristle-supporting elements.

Figure 1:
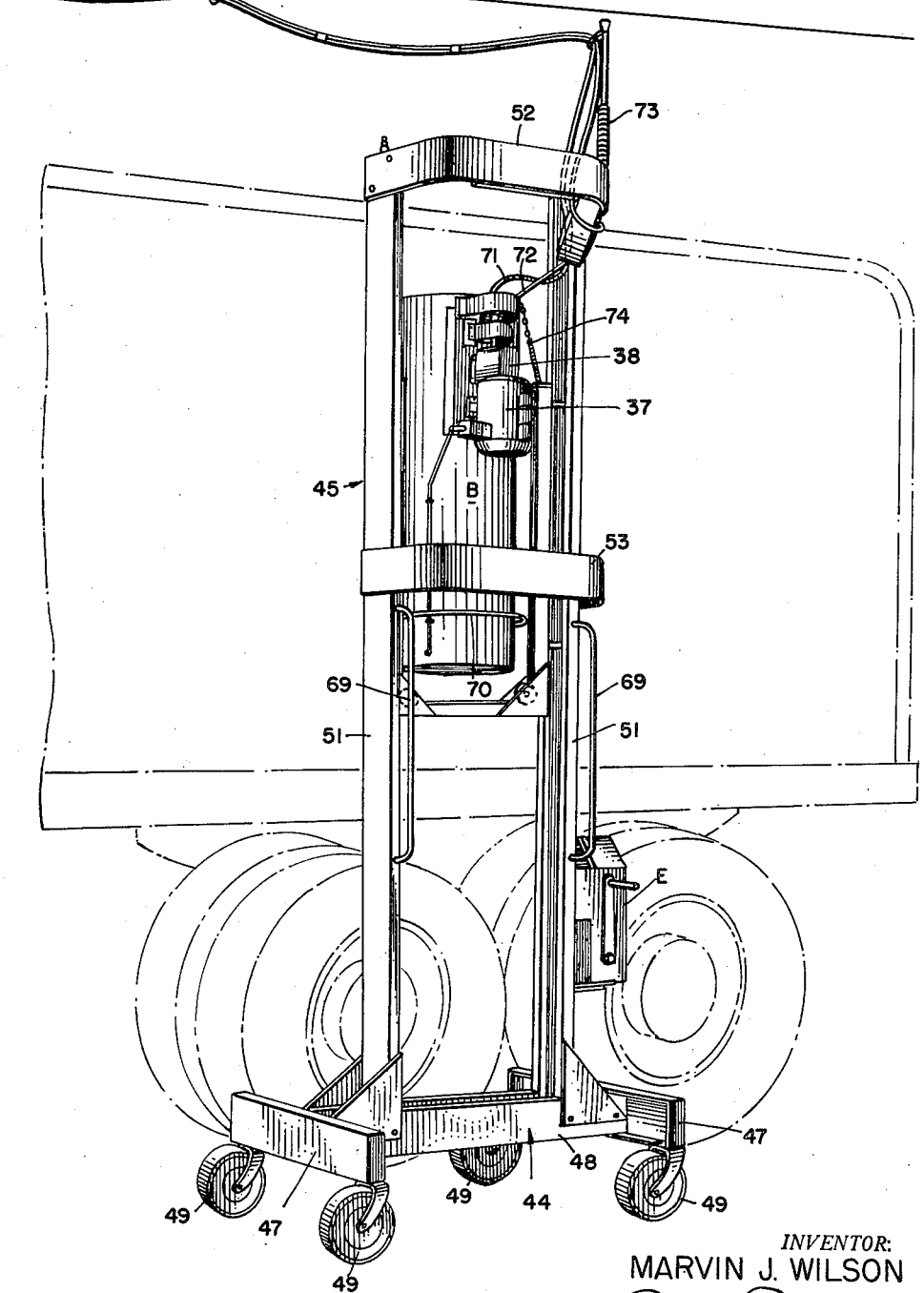
Figure 1 is a perspective view, from the operator's position, of a vehicle washing machine constructed in accordance with this invention, shown in washing operation with respect to the upper part of a large motor-transport body.

The essential concept of this invention involves a cylindrical-shaped brush, the bristles of which are set in U-shaped metal clamps removably locked in slots circumferentially spaced and radially disposed in axially spaced plates secured to a motor-driven shaft journaled in an arcuate-shaped housing shield equipped with water-spray nozzles and tiltably mounted on a cable suspension vertically slidable in a counter-weighted standard uprightly supported on a castered base.

A motor-vehicle washing machine embodying the foregoing concept comprises a motor-driven rotating brush A journaled in a housing shield B, whereon is arranged a water-spray system C, which housing shield is vertically adjustable on a castered support D, by an operator-controlled winch E.

The brush A comprises a supporting shaft 15 mounting a series of discs 16 axially spaced along and secured to the shaft 15, in the peripheral recesses 17 of which discs bristle-supporting elements 18 are locked by brackets 19.

The bristle-supporting elements 18 are shown of elongated U-form which clamp tufts of bristles 21 therein. The recesses 17 in the several discs 16 are formed to permit the elements 18 to be slid longitudinally into the axially alined recesses in the several discs 16.

The locking brackets 19, as is most clearly shown in Figs. 10–12, are small plates bent at 22 to form two slightly angulated parts 23 and 24. The bracket part 23 is recessed at 26 to slide down over an element 18, when the bracket part 23 is disposed at right angles to the element 18.

The bracket part 24 is apertured to receive a threaded bolt 27 for screwing into a threaded hole 28 in the disc 16. When the bracket part 24 is drawn down tight against the disc 16 the recessed bracket part 23 is elevated so that the element 18 is locked in place on the disc 16. Such brackets 19 are required only on the top and bottom discs 16, to effect a rigid assembly of all the bristle-supporting elements 18 on the several discs 16.

The housing shield B comprises a vertical part 28 and a pair of end plates 29 and 31. The vertical part 28 is substantially semi-circular form, along the edges of which are secured flexible strips 30. The end plates 29 and 31 are appropriately reinforced by specially arranged angle bars 32 to insure proper support for the bearings 33 and 34 for the brush shaft 15 (see Fig. 8).

The upper end plate 31, with its removable cover 35, houses a chain and sprocket means 36 (see Fig. 5) by which the brush A is driven by a motor 37. The motor is mounted on the exterior of the housing-shield vertical part 28 and connected to the chain and sprocket means 36 by a suitable reduction gear 38.

The water-spray system C comprises pipes 39, here shown to be of rectangular form (see Fig. 8), arranged vertically along the opposite inner portions of the housing-shield vertical part 28. These pipes 39 are appropriately connected to water feed pipes 41 in turn connected to a source of water supply.

One set of spray heads 42, in the pipes 39 at each side of the housing shield B, are directed into the bristles 21. Another set of the spray heads 43 are directed peripherally outward of the bristles 21 to strike directly onto the vehicle body being washed.

The support D comprises a base section 44 and an upright standard section 45 on the latter of which is slidingly arranged a cable-slung frame 46 mounting the housing shield B (see Figs. 1 and 2).

The base section 44 is formed of several short end bars 47 and intermediate bars 48 transversely arranged to each other and bonded together in the form of an I or wide H. At the corners of the end bars 47 are secured conventional casters 49 which make for easy and convenient rolling of the washing machine on the floor, around the sides and ends of the vehicle being washed.

The standard upright section 45 is in the form of a pair of opposedly-spaced and channelled members 51 bonded and braced at their lower ends to the transverse bars 48 of the base section 44.

At their upper ends, and at a point appropriately intermediate the ends thereof, these upright members 51 are secured together by C-shaped brackets 52 and 53. These serve not only as braces but, being extended outwardly, constitute a counterweight to the brush A and housing shield B, which extend inwardly of the members 51 on the opposite side from the brackets 52 and 53. Blocks 54 here are shown (see Fig. 2) secured to the inner faces of the brackets 52 and 53 to insure ample counterweight to the brush-housing-shield assembly.

The sliding frame 46 is of U-shaped form (see Fig. 3) and mounts pillow blocks 55, for tiltably supporting the brush-shield assembly, and pairs of guides 56 (see Fig. 5) slidingly retained in the channelled upright members 51. At the lower corners of this sliding frame 46 are rollers 57 over which run the cable 58 of the operating winch E.

The operating winch E is a conventional construction. Its form and arrangement of parts are most clearly indicated in Figs. 6 and 7. The cable 58, suspending the brush-shield assembly frame 46, is reeled onto and off a drum 59 mounting a gear 61 meshing with a pinion 62 keyed to a crank shaft 63 by a left-hand screw thread. A ratchet wheel 64, on the shaft 63, mounts a friction plate 65 pressing against a disc 66 integral with the pinion 62. A weighted pawl 67 engages the ratchet wheel 64 and, through the contact of the plate 65 and disc 66, holds the cable drum in any position to which it may be turned by a crank 68.

A winch E, of such a construction, is mounted on one of the upright members 51 of the support D to position the crank 68 for convenient reach by the operator of the machine during vehicle-washing operations.

A cable and spring connection 74, between the housing shield A and the supporting frame 46, limits the tilting movement of the brush-shield assembly.

A water supply tube 71 and an electric cable 72, of appropriate lengths are connected to a flexible post 73 affixed at the upper end of one of the standard members 51. From this post the tube 71 and the cable 72 lead to suitable sources of water and power respectively, and are appropriately suspended overhead adjacent the washing area.

A spring-actuated reel, of conventional structure, is secured to the bracket 52 adjacent the post 73 and receives the electric cable 72 to automatically reel it out and in with the changing vertical position of the brush-shield assembly on the supporting standard members 51.

Hand-grips 69 and 70 are arranged to permit the operator's convenient maneuvering of the machine for vehicle washing. The hand-grips 69 are secured to each of the standard members 51 below the intermediate bracket 53. These permit the pushing of the castered support D along and around the vehicle being washed.

The hand-grip 70 is positioned near the lower end of the housing shield B to permit the operator to tilt the brush-shield assembly, on the frame 46, to accommodate the brush A, as nearly as possible, to any irregular contour of the vehicle body.

The operation of this washing machine is believed to be so obvious from the foregoing description, as to require this brief explanation.

Grasping the hand-grips 69, the operator moves the machine over the floor into washing position adjacent the vehicle body. The crank 68 on the winch E, is turned to locate the brush A at the desired height with respect to the vehicle body to be washed. Water and current being turned on, the brush A is rotated and jets of water are projected into the bristles 19 and onto the sides of the vehicle body adjacent the area of brush contact.

Preferably the machine is initially positioned adjacent the vehicle body at that end which will permit the rotating brush, in washing contact with the vehicle body, to tend to pull the machine along toward the opposite end of the vehicle body. This will lessen the effort which the operator has to exert to move the machine along the floor during the washing operation.

If the vehicle body being washed is curved along its top or bottom edges, or at any other lengthwise portion, the operator may grasp the hand-grip 70 to tilt the brush-shield assembly on the pillow blocks 55 to insure a better contact of the brush bristles with the irregular areas of the vehicle body.

It is to be understood that some of the details of the construction shown and described may be altered or omitted without departing from the spirit of this invention as defined by the following claims.

I claim:

1. A vehicle washing-machine comprising, an I-shaped supporting base the transverse end members of which are each of a length not materially in excess of half the length of the connecting member, casters journaled adjacent the ends of the end members, a pair of upright standards of a length substantially equal to the height of a conventional freight-hauling motor vehicle, the standards being secured to the connecting member of the base inwardly of the end members, a frame vertically slidable on the standards, an arcuate-shaped housing shield pivotally secured to said frame on a horizontal axis, a cylindrical brush journaled on the housing shield with its axis of rotation disposed horizontally outward from the plane of the standards and closely adjacent to a plane parallel to said axis of rotation passing through the ends of the base end members, weighted brackets secured to the standards and extending horizontally outward therefrom on the side opposite the hingedly-mounted brush to counter-balance the weight thereof, and a crank-operated friction-disc ratchet-controlled winch journaled on the standards and connected by cable to the brush shield to vertically position the brush for effective operative contact with a motor vehicle.

2. A vehicle washing-machine comprising, an I-shaped supporting base the transverse end members of which are each of a length not materially in excess of half the length of the connecting member, casters journaled adjacent the ends of the end members, a pair of upright standards of a length substantially equal to the height of a conventional freight-hauling motor vehicle, the standards being secured to the connecting member of the base inwardly of the end members, a frame vertically slidable on the standards, an arcuate-shaped housing shield pivotally secured to said frame on a horizontal axis, a cylindrical brush journaled on the housing shield with its axis of rotation disposed horizontally outward from the plane of the standards and closely adjacent to a plane parallel to said axis of rotation passing through the ends of the base end members, a pair of weighted C-shaped brackets secured to the standards to extend horizontally outward therefrom on the side opposite the hingedly-mounted brush to counter-balance the weight thereof, one of the brackets being secured adjacent the upper ends of the standards and the other bracket being secured medially of the standards, and a crank-operated friction-disc ratchet-controlled winch journaled on the standards and connected by cable to the brush shield to vertically position the brush for effective operative contact with a motor vehicle.

3. A vehicle washing-machine comprising, an I-shaped supporting base the transverse end members of which are each of a length not materially in excess of half the length of the connecting member, casters journaled adjacent the ends of the end members, a pair of upright standards of a length substantially equal to the height of a conventional freight-hauling motor vehicle, the standards being secured to the connecting member of the base inwardly of the end members, a frame vertically slidable on the standards, an arcuate-shaped housing shield pivotally secured to said frame on a horizontal axis, a cylindrical brush journaled on the housing shield with its axis of rotation disposed horizontally outward from the plane of the standards and closely adjacent to a plane parallel to said axis of rotation passing through the ends of the base end members, a pair of weighted C-shaped brackets secured to the standards to extend horizontally outward therefrom on the side opposite the hingedly-mounted brush to counter-balance the weight thereof, one of the brackets being secured adjacent the upper ends of the standards and the other bracket being secured medially of the standards, a crank-operated friction-disc ratchet-controlled winch journaled on the standards and connected by cable to the brush shield to vertically position the brush for effective operative contact with a motor vehicle, and a pair of hand-grip rods secured to each of the standards on the side opposite the brush and extending a material distance along the respective standards intermediate the second bracket and the supporting base.

References Cited in the file of this patent

UNITED STATES PATENTS

| | | |
|---|---|---|
| 649,786 | Wheeler | May 15, 1900 |
| 2,124,705 | Locklin | July 26, 1938 |
| 2,636,198 | Wilson | Apr. 28, 1953 |
| 2,651,798 | Lombardi | Sept. 15, 1953 |
| 2,721,348 | Blydenburgh | Oct. 25, 1955 |

FOREIGN PATENTS

| | | |
|---|---|---|
| 692,005 | Great Britain | May 27, 1953 |